US012568882B2

(12) United States Patent
Füchtling et al.

(10) Patent No.: US 12,568,882 B2
(45) Date of Patent: Mar. 10, 2026

(54) SELF-PROPELLED HARVESTER HAVING A HEIGHT-ADJUSTABLE PICK-UP DEVICE

(71) Applicant: CLAAS Selbstfahrende Erntemaschinen GmbH, Harsewinkel (DE)

(72) Inventors: Christian Füchtling, Rinkerode (DE); Andreas Wielenberg, Herford (DE); Udo Beschorn, Harsewinkel (DE); Marcus Gehrmann, Marienfeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 773 days.

(21) Appl. No.: 17/940,198

(22) Filed: Sep. 8, 2022

(65) Prior Publication Data

US 2023/0076926 A1     Mar. 9, 2023

(30) Foreign Application Priority Data

Sep. 9, 2021    (DE) ..................... 10 2021 123 337.2

(51) Int. Cl.
*A01D 75/28*          (2006.01)
*A01D 41/14*          (2006.01)
(52) U.S. Cl.
CPC ......... *A01D 41/141* (2013.01); *A01D 41/145* (2013.01); *A01D 75/287* (2013.01)
(58) Field of Classification Search
CPC .... A01D 34/28; A01D 34/283; A01D 34/286; A01D 41/14; A01D 41/16; A01D 41/141; A01D 41/145; A01D 75/287
See application file for complete search history.

(56) References Cited

U.S. PATENT DOCUMENTS 8,245,489 B2 *   8/2012   Talbot ................. A01D 41/141
                                                                  56/15.8
10,278,330 B2 *   5/2019   Silver .................... A01D 41/06
                (Continued)

FOREIGN PATENT DOCUMENTS

DE            4105260 A  * 10/1991   ............. A01D 41/14
DE      102004032065 A1    2/2006
                (Continued)

OTHER PUBLICATIONS

European Search Report for European application No. 22173945.1-1105 mailed Nov. 17, 2022.

*Primary Examiner* — Adam J Behrens
(74) *Attorney, Agent, or Firm* — Lempia Summerfield Katz LLC

(57)          ABSTRACT

A self-propelled harvester having a height-adjustable pick-up device, on which an attachment pivotable about a virtual pendulum axis of the pick-up device is positioned for picking up harvested material is disclosed. The pick-up device is configured for adaptive adjustment of a vertical distance of the attachment from the ground. Further, at least one support wheel is positioned at least on the outer lateral regions of the attachment. The support wheel may be guided in a height-movable manner by a hydraulic cylinder connected to a hydraulic circuit of a hydraulic system having a pressure source. Position regulation of the attachment transverse to the forward direction of travel by pivoting about the virtual pendulum axis is independent of a transverse guidance of the attachment controlled or regulated by the harvester.

17 Claims, 4 Drawing Sheets

(56) References Cited

U.S. PATENT DOCUMENTS

| | | | | |
|---|---|---|---|---|
| 10,462,966 | B2 * | 11/2019 | Smith | A01D 41/141 |
| 10,531,607 | B2 * | 1/2020 | Schroeder | A01D 41/141 |
| 11,109,529 | B2 * | 9/2021 | Fuechtling | A01D 34/04 |
| 11,246,259 | B2 * | 2/2022 | Yanke | A01D 34/246 |
| 11,304,369 | B2 | 4/2022 | Bormann et al. | |
| 11,382,268 | B2 * | 7/2022 | Hunt | A01D 41/1271 |
| 12,082,529 | B2 * | 9/2024 | Trowbridge | A01D 41/14 |
| 2002/0005033 | A1 * | 1/2002 | Uhlending | A01D 75/287 56/15.8 |
| 2015/0033692 | A1 * | 2/2015 | Schroeder | A01D 41/141 56/10.2 E |
| 2016/0183461 | A1 * | 6/2016 | Neudorf | A01D 41/145 56/158 |
| 2016/0295796 | A1 * | 10/2016 | Fischer | A01D 75/287 |
| 2018/0070531 | A1 | 3/2018 | Long et al. | |
| 2018/0098491 | A1 | 4/2018 | Long et al. | |
| 2018/0168101 | A1 * | 6/2018 | Fuchtling | A01D 34/28 |
| 2019/0116731 | A1 * | 4/2019 | Berggren | A01B 63/10 |
| 2019/0297775 | A1 * | 10/2019 | Fuechtling | A01D 34/04 |
| 2019/0335663 | A1 * | 11/2019 | Capello | A01D 45/30 |
| 2020/0390035 | A1 * | 12/2020 | Hunt | A01D 41/144 |
| 2021/0127575 | A1 * | 5/2021 | Farley | A01B 63/10 |
| 2021/0289703 | A1 * | 9/2021 | Hunt | A01D 41/141 |
| 2021/0307233 | A1 * | 10/2021 | Lyons | A01B 73/005 |
| 2021/0329837 | A1 * | 10/2021 | Schnaider | A01D 41/145 |
| 2022/0304230 | A1 * | 9/2022 | Saraiva | A01D 41/16 |
| 2022/0369557 | A1 * | 11/2022 | Hunt | A01D 41/145 |

FOREIGN PATENT DOCUMENTS

| | | | | |
|---|---|---|---|---|
| DE | 102004058116 | A1 * | 6/2006 | A01D 41/16 |
| DE | 102018107804 | A1 | 10/2019 | |
| DE | 102019111587 | A1 | 11/2020 | |
| DE | 102020110574 | A1 | 11/2020 | |
| EP | 1374661 | A1 * | 1/2004 | A01D 41/141 |
| EP | 2832206 | A1 | 2/2015 | |
| EP | 3735817 | A1 | 11/2020 | |
| WO | 2020185873 | A1 | 9/2020 | |

* cited by examiner

SELF-PROPELLED HARVESTER HAVING A HEIGHT-ADJUSTABLE PICK-UP DEVICE

CROSS REFERENCE TO RELATED APPLICATION

This application claims priority under 35 U.S.C. § 119 to German Patent Application No. DE 10 2021 123 337.2 with filing date Sep. 9, 2021, the entire disclosure of which is hereby incorporated by reference herein.

TECHNICAL FIELD

The present invention relates to a self-propelled harvester with a height adjustable pick-up device.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

WO 2020/185873 A1 discloses a self-propelled harvester with a height-adjustable pick-up device on which an attachment for picking up harvested material is arranged or positioned that may be pivoted about a virtual pendulum axis of the pick-up device. The attachment may be pivoted about the virtual pendulum axis of the pick-up device using one or more hydraulic cylinders, which may be controlled by a control device of the harvester and are arranged or positioned on the pick-up device.

DE 10 2020 110 574 A1 discloses a self-propelled harvester with a height-adjustable pick-up device on which an attachment for picking up harvested material is arranged or positioned that may be pivoted about a virtual pendulum axis of the pick-up device. The pick-up device is configured for adaptive adjustment of a vertical distance between the attachment and the ground in that the pick-up device and the attachment arranged thereon may be positioned at different vertical distances using two hydraulic cylinders, each of which is supported at the end on the frame of the harvester. At least on the outer lateral regions of the attachment, at least one support wheel is arranged or positioned in each case and is guided in a vertically movable manner in each case by a hydraulic cylinder connected to a hydraulic circuit of a hydraulic system having a pressure source. The support wheels are pivotably connected to a frame part of the attachment, wherein the support wheels are located in the rear region of the attachment (e.g., the rear of the attachment facing the pick-up device). The support wheels function as feeler wheels for ground guidance of the attachment. The support wheels are extended according to a vertical distance specified by an operator of the harvester until ground contact exists. In this position, the hydraulic cylinders of the support wheels are locked in order to work at a constant working height when guiding the attachment over the field soil to be worked. The attachment disclosed in DE 10 2020 110 574 A1 is configured to react to a setting of the vertical distance changed by the operator by actuating the hydraulic cylinders of the support wheels by retracting or extending both.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
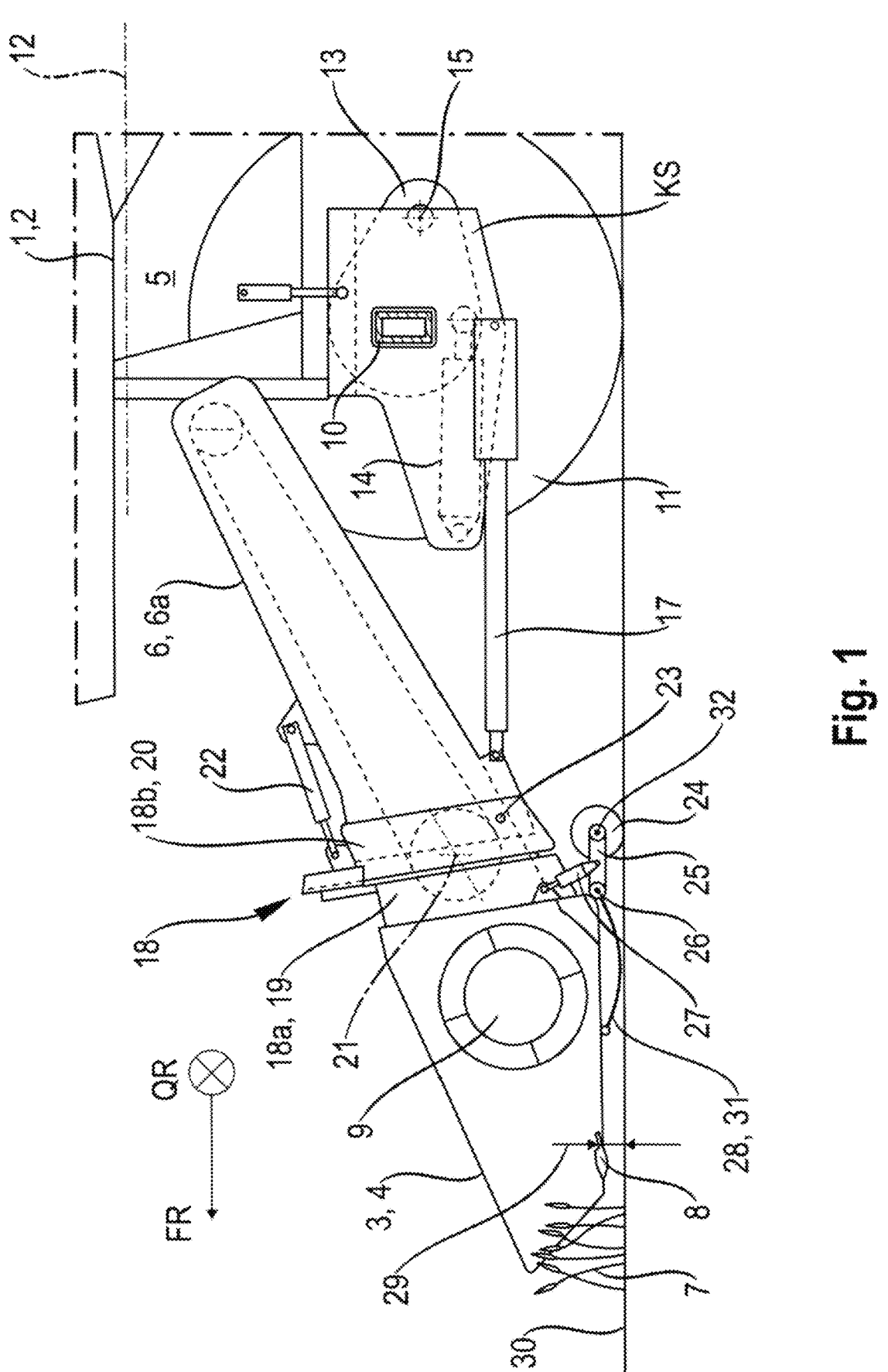
FIG. 1 schematically illustrates an example of a front design of a self-propelled harvester.

With regard to WO 2020/185873 A1, in the case of attachments with a very large working width (e.g., a total width of more than 12 m) and/or a very high dead weight, pivoting the attachment when tracking the attachment over its entire working width to adapt to a changed ground contour in the transverse direction may adversely affect operation of the harvester.

Further, with DE 10 2020 110 574 A1, the position of the attachment is only adjusted to a change in the ground contour detected by the feeler wheels after the front attachment has already passed the change in the ground contour. The distance of the front area of the attachment in which harvested material is picked up or collected may not be optimally tracked when the ground contour changes. In addition, it cannot be ensured that the feeler wheels or support wheels are always in contact with the ground, for example, if the underside of the attachment rests on the ground due to a change in the ground contour. In one particular example, when regulating the attachment by ground pressure when the attachment is placed on the ground with a certain proportion of its total weight, this may lead to strong fluctuations in the load exerted on the feeler wheels and the underside of the attachment.

Given this, a self-propelled harvester is disclosed that improves tracking of the attachment when adapting to a changed ground contour, for example, so that the average distance between the front area of the attachment and the ground is essentially the same (e.g., essentially the same on average), and the force with which the support wheels are supported on the ground is kept essentially constant (e.g., essentially constant on average).

In one or some embodiments, a self-propelled harvester is disclosed with a height-adjustable pick-up device on which an attachment pivotable about a virtual pendulum axis of the pick-up device is arranged or positioned for picking up or collecting harvested material. The pick-up device is configured for adaptive adjustment of a vertical distance of the attachment from the ground. Further, at least one support wheel is arranged or positioned in each case at least on a part of the attachment, such as the outer lateral regions of the attachment. Further, in one or some embodiments, the at least one support wheel may be guided in a height-movable manner in each case by a hydraulic cylinder connected to a hydraulic circuit of a hydraulic system having a pressure source. According to the invention, a position regulation of the attachment in transverse direction by pivoting about the virtual pendulum axis is independent of at least one actuator that is for transverse guidance of the attachment, is actuated by the harvester, and is arranged or positioned on the pick-up device.

In one or some embodiments, the attachment may pivot about the virtual pendulum axis in the transverse direction in its working mode or harvesting mode independent of the actuation of the at least one actuator on the pick-up device, in order to compensate for irregularities in the ground contour which lead to a one-sided change of a preset cutting height.

The at least one actuator arranged or positioned on the pick-up device may be actuated to transfer it to a floating position. The function of the actuator actuated for active transverse guidance by actuating the harvester may be switched to neutral so that the attachment is independent of the transverse guidance of the attachment controlled or regulated by the harvester using the at least one actuator.

For this purpose, the position of the attachment may be regulated transversely to the direction of travel using the support wheel arranged or positioned on the particular lateral area, wherein the pressurization of the hydraulic cylinders may be adapted alternately in order to compensate, in a pressure-controlled manner, for an actual transverse position of the attachment that deviates from a target transverse position. The target transverse position corresponds, in relation to the entire working width of the attachment, to a mean vertical distance to be maintained between the front area of the attachment and the ground at which the hydraulic forces acting on the support wheels may essentially be the same. The actual transverse position describes, again in relation to the entire working width of the attachment, a deviation of the actual vertical distance of the front area of the attachment from the ground caused by a change in the ground contour which may be compensated by a relative deflection of the attachment about the virtual pendulum axis of the pick-up device. Using the pressure control, a valve arrangement associated with a particular hydraulic cylinder may be actuated in such a way that one hydraulic cylinder is subjected to a lower pressure (e.g., relieved) while the other hydraulic cylinder is subjected to a greater pressure by the other valve arrangement (e.g., is subjected to a greater load). This may allow the attachment to be swiveled alternately to the left or right. In one or some embodiments, as soon as the adjustment of the actual transverse position to the target transverse position has been completed, both hydraulic cylinders may again continuously regulate (e.g., uniformly pressurized).

In one or some embodiments, the hydraulic cylinders of the support wheels may be designed as dual-acting hydraulic cylinders.

In one or some embodiments, a control device may be provided which is configured for pressure-controlled actuation of a valve assembly assigned to the particular hydraulic cylinder, wherein the valve assembly is configured to regulate a hydraulic pressure, provided by the pressure source, in the hydraulic cylinder as a function of an operating mode of the attachment selected during operation. In particular, height regulation and ground pressure regulation may be provided as operating modes. In height regulation, a vertical working height to be maintained above the ground is specified, in which the front area of the attachment is to be guided above the ground, which corresponds to a pick-up height for the material to be harvested. For this purpose, the control device may control hydraulic cylinders provided or resident on the pick-up device, which may swivel the pick-up device and the attachment arranged or positioned thereon in the vertical direction about a transverse axis orthogonal to its virtual pendulum axis. The total weight of the attachment may be absorbed by the harvester. With ground pressure regulation, the attachment may rest on the ground, which may result in proportional weight relief. While height regulation may focus on maintaining the average distance to the ground by tracking in the transverse direction, the aim of ground pressure regulation may be to apply as uniform a load as possible to the ground, for example, to prevent pushing up. The pressure regulation may ensure that the force with which the support wheels are supported on the ground remains predetermined, such as constant on average.

In one or some embodiments, the control device may be configured to actuate the valve assembly assigned to the particular hydraulic cylinder in such a way that one hydraulic cylinder is subjected to a lower pressure (e.g., relieved) while the other hydraulic cylinder may be subjected to a higher pressure by the other valve arrangement (e.g., is subjected to a greater load). The control device may be configured to compensate for an actual transverse position of the attachment that deviates from a target transverse position in a pressure-regulated manner.

Another advantage of pressure regulation may result when lifting the attachment from its working position in working mode or harvesting mode to a position at a distance from the ground in which the support wheels are not in contact with the ground, for example in the headland. The pressure regulation may cause the hydraulic cylinders to be extended further when the front attachment is lifted so that the attachment initially continues to be supported on the ground. In one or some embodiments, only when an end stop of the hydraulic cylinders is reached may a retraction of the hydraulic cylinders be actuated in order to transfer the support wheels from their working position to their transport position.

In one or some embodiments, the control device may be arranged or positioned on the attachment. Alternatively, the control device may be positioned on the harvester. Still alternatively, parts of the control device may reside on the harvester and on the attachment.

In one or some embodiments, the control device may be configured for autonomous actuation of the valve assemblies. The control device may actuate the valve assemblies independently of the harvester in order to track the attachment in the event of a change in the ground contour in the transverse direction by pivoting about the virtual pendulum axis of the pick-up device. In one or some embodiments, the autonomously operating control device may actively control or regulate the tracking of the attachment in the transverse direction.

In one or some embodiments, several independently operating sensor apparatuses may be assigned to the attachment and may be configured to detect the distance between the attachment and the ground. In particular, in one or some embodiments, the sensor apparatuses may be arranged or positioned at the smallest possible distance from the front area of the attachment. The small distance to the front area of the attachment may enable an earlier reaction to changes in the ground contour, which may require or trigger an adjustment of the transverse position of the attachment.

In particular, sensors may be assigned to the particular support wheel and may be configured to detect its position relative to the attachment and/or the set pressure in the particular hydraulic cylinder of the support wheels. The detection of the position relative to the attachment may be used to ensure that when the attachment is transferred from a working position to a transport position, the support wheels may be swiveled about their swivel axis running in the transverse direction. In the transport position, the particular hydraulic cylinders may be fully retracted so that the support wheels have the greatest possible distance from the ground. In this way, during transport, the support wheels are less likely to contact the ground when the ground contour is uneven.

In one or some embodiments, the control device may be configured to evaluate signals from the sensor apparatuses to determine the actual transverse position in order to correct the actual transverse position deviating from the desired transverse position of the attachment by loading or unloading the particular support wheel by actuating the valve assemblies in opposite directions when pressurizing the hydraulic cylinders. In particular, responsive to the sensor apparatuses generating sensor data that may be used to determine the actual transverse position, the actual transverse position may be compared to the desired transverse position. Responsive to the comparison (e.g., responsive to detecting a difference between the actual transverse position and the desired transverse position being greater than a predetermined amount), the control device may actuate the valve assemblies (e.g., in opposite directions).

Due to the active actuation of the support wheels, the deviation from the target transverse position may already be adjusted by a changing ground contour when this is detected by the sensor apparatuses arranged or positioned in the front area of the attachment. The distance between the front area of the attachment and the ground may be tracked (such as optimally tracked), which may have a correspondingly positive effect on harvested material intake or pickup.

In one or some embodiments, the regulation of the pressures in the hydraulic cylinders may be continuous, which may ensure the optimum position of the support wheels, even if a vertical working height above the ground to be maintained is changed in height regulation operating mode. At the same time, pressure regulation may ensure that the force with which the support wheels are supported on the ground remains constant on average.

Furthermore, the control device may be configured to determine, on the basis of the evaluation of the signals from the sensor apparatuses, whether the target transverse position has been reached and whether to continue the actuation of the valve assemblies in accordance with the selected operating mode.

In particular, the sensor apparatuses may be designed as sensing brackets or as non-contact distance sensors.

In one or some embodiments, the attachment may be designed as a draper which may comprise a central section and at least two side sections which are each connected to the central section by a frame joint so as to be pivotable about a pivot axis running parallel to the longitudinal axis of the harvester. Further, a particular side section (of the at least two side sections) may be pivotable using an actuator relative to the central section about the pivot axis transverse to the direction of travel.

When the attachment is designed as a draper, one or more supporting arms which may be pivoted about an axis running in the transverse direction, may be arranged or positioned on the central section and the side sections. Further, the one or more supporting arms may carry a flexible cutter bar extending over at least a part of the draper (such as the width of the draper). In addition, for detecting a vertical deflection of the supporting arms of the central section and the side sections about the axis running in the transverse direction, a plurality of sensor apparatuses are provided which may be designed as a measuring shaft connected in a rotationally fixed manner to the supporting arms of the central section, and as at least one measuring shaft connected in a rotationally fixed manner to the supporting arms of the particular side section, and potentiometers arranged or positioned thereon. The particular measuring shaft may be spaced from the flexible cutter bar by the support arms. With the draper, the measuring shafts with the potentiometers arranged or positioned thereon may be used to determine the distance between the attachment and the ground. This is particularly the case when the draper is operated in so-called flex mode. In this operating mode, the support arms bearing the flexible cutter bar may be deflected downward and/or upward, at least sectionally, starting from a horizontal center position by changes in the ground contour transverse to the direction of movement of the attachment borne by the harvester in the vertical direction, also within a side section. The translatory movement of the support arms generated by the deflection produces a rotary movement of the measuring shafts, which may be detected by the potentiometers arranged or positioned on the measuring shafts. The signals from the potentiometers may be evaluated in the same way as signals from sensor apparatuses designed as sensing brackets.

Referring to the figures, the illustration in FIG. 1 shows the basic front design of a self-propelled harvester 1 designed as a combine harvester 2 with an attachment 3 which, in the depicted embodiment, is designed as a grain header 4. An example of the combine harvester 2 is disclosed in U.S. Pat. No. 11,304,369, incorporated by reference herein in its entirety. The attachment 3 is arranged or positioned on a machine frame 5 of the harvester 1 using a pick-up device 6, which may be designed as an inclined conveyor 16. The terms pick-up device 6 and inclined conveyor 16 are used synonymously below. The pick-up device 6 may be pivotably mounted on the machine frame 5 (interchangeably termed a machine housing) about a pivot axis extending transversely to the forward travel direction FR of the harvester 1. The inclined conveyor 16 conveys the harvested material 7 to a threshing unit (not shown) as a working unit of the harvester 1. A cutter bar 8 and a transverse conveyor 9 are located on the attachment 3 and serve to transport the harvested material 7 in front of the inlet-side opening of the inclined conveyor 16. A front axle 10 of the harvester 1 is rigidly connected to the machine frame 5. The running wheels 11 may be mounted on the front axle 10 in a height-adjustable manner so that horizontal alignment of the units mounted in the machine frame 5 may be possible for harvesting on slopes. For this purpose, the harvester 1 is equipped with two wheel gears 13, which may be pivotably connected to the ends of the front axle 10 via brackets KS. Piston cylinder units 14 are supported on the brackets KS, the piston rods of which engage with the wheel gears 13, which in turn may be pivoted about fixed axes 15 in the brackets KS. A longitudinal axis of the harvester 1 may be designated by element 12.

The pick-up device 6 and the attachment 3, arranged or positioned on the pick-up device 6, may be raised and/or lowered by piston cylinder units 17, which may be attached by one end to the underside of the pick-up device 6 and by their other end in the area of the front axle 10. The attachment 3 may be coupled using a pivoting apparatus 18. Such a pivoting apparatus 18 is disclosed in DE 10 2019 111 587 A1, the disclosure of which is incorporated by reference herein in its entirety. The pivoting apparatus 18 comprises (or consists of) an attachment-side frame structure 19 designed as a pendulum frame 18a and a harvester-side frame structure 20 designed as a tilt frame 18b. The pendulum frame 18a may be pivotally mounted relative to the tilt frame 18b about a virtual pendulum axis 21 extending approximately in the forward direction VR, and thereby may allow the attachment 3 to swing relative to the pick-up device 6 about the virtual pendulum axis 21. In one or some embodiments, the virtual pendulum axis 21 is formed at the center of the pendulum frame 18*a*. In one or some embodiments, the tilt frame 18*b* (that may be configured to tilt) is mounted on the pick-up device 6 by a piston cylinder unit 22 so as to be pivotable about a lower transverse axis 23, so that a cutting angle of the attachment 3 may be adjusted in the longitudinal direction of the machine.

Figure 2:
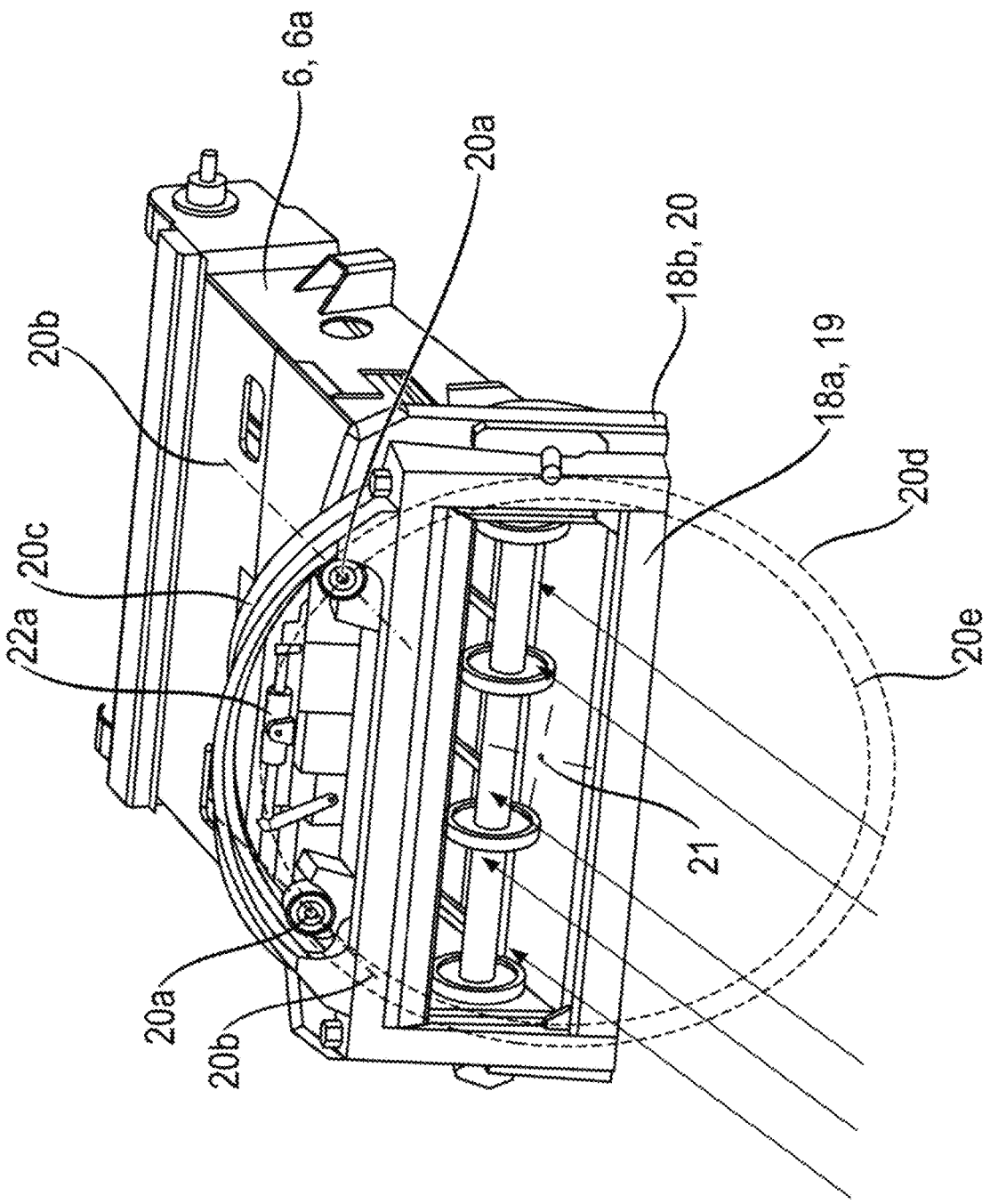
FIG. 2 illustrates a view from the front of a pick-up device of the harvester.

FIG. 2 illustrates a view from the front of a pick-up device 6 of the harvester 1. In one or some embodiments, the tilt frame 18*b* supports two support rollers 20*a* in the upper area which are rotatable about their axes 20*b* extending parallel to the direction of the virtual pendulum axis 21. A support element 20*c* rests on the support rollers 20*a* and extends along a circular path 20*d*, which in turn may be arranged or positioned concentrically to the virtual pendulum axis 21 and may be connected to the pendulum frame 18*a*. The described arrangement of the support rollers 20*a* enables the pendulum frame 18*a* to swing about the virtual pendulum axis 21. In the depicted embodiment, two support rollers 20*a* are mounted on the tilt frame 18*b* symmetrically with respect to the longitudinal center plane of the tilt frame 18*b* on a circular path 20*e* extending concentrically with respect to the virtual pendulum axis 21.

In one or some embodiments, for active pivoting of the attachment 3 about the virtual pendulum axis 21, an actuator/swivel cylinder 22*a*, which may be designed as a pivoting cylinder, is fastened between the pendulum frame 18*a* and the tilt frame 18*b* so that the actuator/swivel cylinder 22*a* (e.g., including a pivoting cylinder) may actively pivot the pendulum frame 18*a* relative to the tilt frame 18*b* about the virtual pendulum axis 21. In one or some embodiments, this is in a floating position during a working mode or harvesting mode so that the attachment 3 may be attached to the harvester 1 in a free-swinging manner. For active pivoting of the attachment 3, the actuator/swivel cylinder 22*a* on the pick-up device 6 may be actuated by a control unit of the combine harvester 2 in order to transfer and hold the attachment 3 in a horizontal position in a raised position in which support wheels 24 arranged or positioned on the attachment have no contact with the ground.

A necessary transverse compensation, which describes the pivoting of the attachment 3 about the virtual pendulum axis 21 to adapt the position of the attachment 3 to changing ground contours, takes place during the working mode or harvesting mode using two height-adjustable support wheels 24. For this purpose, in one or some embodiments, two holders 25 (interchangeably termed brackets) are fastened to the attachment 3 so as to be pivotable about an axis 26 extending transversely to the forward travel direction FR. The holders 25 may be fastened in the outer lateral region of the attachment 3 and may be arranged or positioned symmetrically with respect to the longitudinal center plane of the attachment 3, which in the depicted embodiment corresponds to the longitudinal center plane of the pendulum frame 18*a*. The holder 25 may be pivoted using one hydraulic cylinder 27, each of which may be attached to the attachment 3 and the holder 25. In one or some embodiments, the hydraulic cylinders 27, which may be designed as dual-acting hydraulic cylinders, may be controlled using one or more sensor apparatuses 28 with which a distance 29 of the cutter bar 8 as the front area of the attachment 3 and ground 30 is measured (such as continuously measured or periodically measured) in a manner known per se. The sensor apparatuses 28 in the depicted embodiment may be pivotable sensing brackets 31. The sensing brackets 31 may be arranged or positioned on the underside of the attachment

3. In one or some embodiments, the distance of the arrangement of the sensing brackets 31 to the cutter bar 8 is selected to be as small as possible in order to be able to react to changes in the ground contour at an early stage. Alternatively, the sensor apparatuses 28 may operate without contact. The support wheels 24 may be attached to the holder 25 so as to be rotatable about an axis 32 extending transversely to the forward travel direction VR. Depending on the operating mode selected for the attachment 3, the support wheels 24 may be guided over the ground 30 during the working mode and may be actuated based on the sensor signal(s) of the sensor apparatus(es) 28 in such a way that the position of the attachment 3 is adapted or conformed to existing ground contours.

One operating mode is cutting height regulation in which the distance 29 to be maintained between the cutter bar 8 and the ground 30 is predefined and set by actuating the piston cylinder units 17.

Another operating mode is so-called ground pressure regulation. In the ground pressure regulation operating mode, the attachment 3 rests on the ground 30 so that the dead weight of the attachment 3 is transferred proportionally to the ground.

Figure 3:
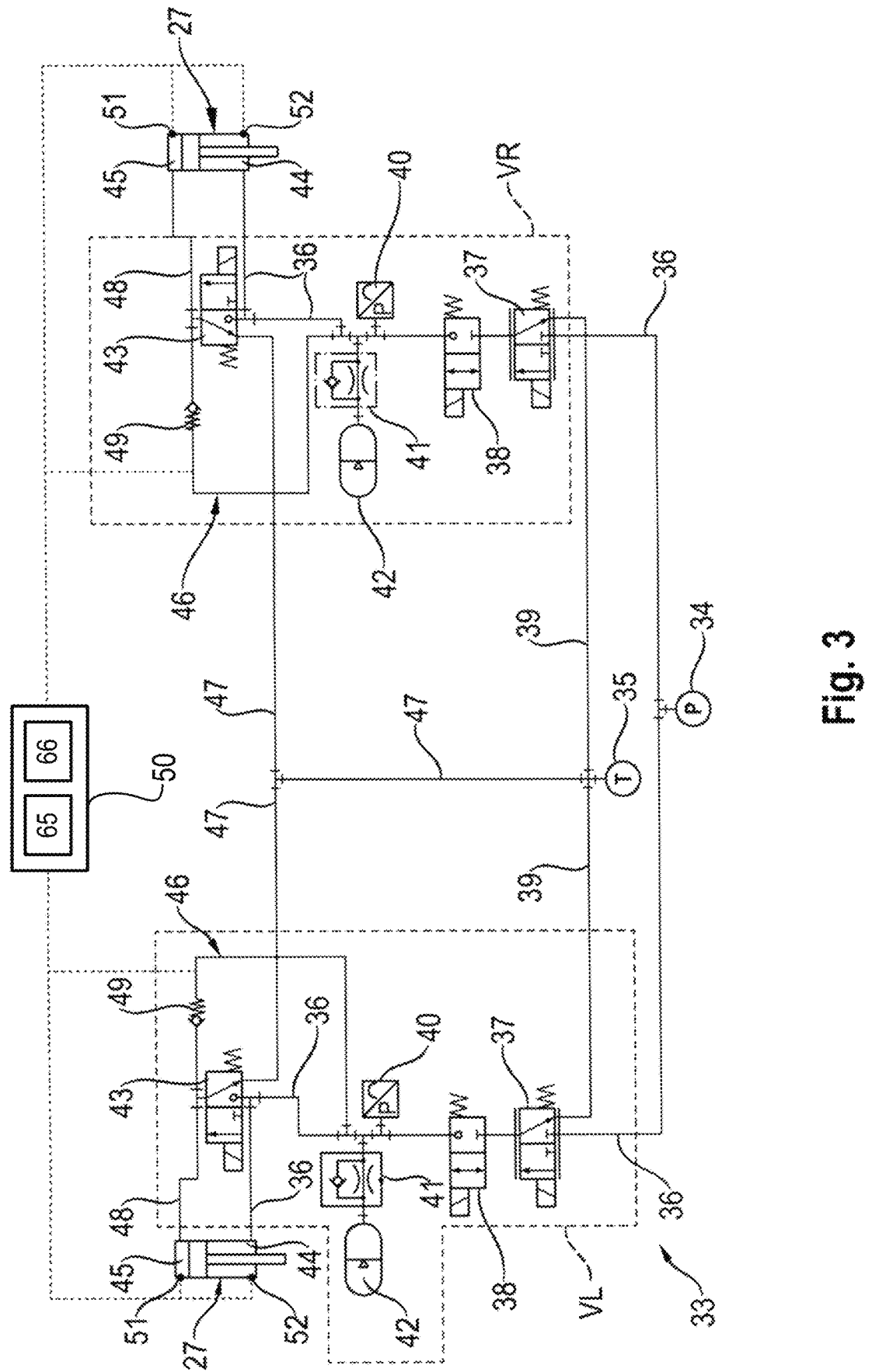
FIG. 3 illustrates an exemplary circuit diagram for actuating support wheels of the attachment.

FIG. 3 illustrates an example of a circuit diagram for actuating the support wheels 24 of the attachment 3. A hydraulic system 33 is provided on the attachment 3 for actuating the externally arranged or positioned support wheels 24, which may comprise a common pressure source 34 and a common tank 35. In one or some embodiments, the layout of the hydraulic system 33 is designed as a mirror image for the laterally opposite support wheels 24 of the attachment 3 so that the following description of the other components of the hydraulic system 33 is applicable for both support wheels 24 arranged or positioned laterally on the attachment 3. Associated with the particular hydraulic cylinder 27 is a valve assembly VL, VR, which is explained further below.

From the common pressure source 34, which may be a hydraulic pump of the self-propelled harvester 1, a pressure line 36 leads to a switchable valve 37, designed as a 3/2 directional control proportional valve, and an optional 2/2 directional control valve 38 connected downstream thereof, which may be designed to be single-sealed. Using the optional 2/2 directional control valve 38, a leakage flow may be prevented from hydraulic fluid flowing out through the switchable valve 37. As shown in FIG. 3, the switchable valve 37 may assume a switched state in which the pressure line 36 is connected to the tank 35 via a hydraulic line 39. The 2/2 directional control valve 38 may be in a switched position, in which hydraulic fluid is prevented from flowing out of the pressure line 36 via the switchable valve 37 into the tank 35.

A pressure sensor 40 downstream from the switchable valve 37 designed as a 3/2 directional control proportional valve or the 2/2 directional control valve 38 may monitor the hydraulic pressure in the pressure line 36. Associated with the particular hydraulic cylinder 27 is a throttle check valve 41 with a pressure accumulator 42 which may be arranged or positioned in the pressure line 36 connecting the common pressure source 34 of the hydraulic system 33 to the hydraulic cylinder 27.

Furthermore, a 3/2 directional control valve 43 may be assigned to the hydraulic cylinder 27, and when the attachment 3 is in harvesting mode, it may assume a switched state by being energized, in which piston rod chamber 44 and piston chamber 45 of the hydraulic cylinder 27 are connected in a fluid-conducting manner. A common closed hydraulic circuit 46 may be formed by the fluid-conducting connection of piston rod chamber 44 and piston chamber 45 of the dual-acting hydraulic cylinder 27. The particular hydraulic circuit 46 may be fed by the pressure source 34. While the attachment 3 is operating (e.g., during a harvesting process), the switched position of the 3/2 directional control valve 43 connecting the piston rod chamber 44 and the piston chamber 45 to each other in a fluid-conducting manner causes, as soon as piston chamber 45 and piston rod chamber 44 are connected to each other, the hydraulic cylinder 27 to move only due to external influences, such as due to ground unevenness. In this case, hydraulic fluid displaced from piston chamber 45 may flow through the 3/2 directional control valve 43 into the pressure accumulator 42. Depending on the cylinder movement, the differential volume may be taken from the pressure accumulator 42 or may be pushed back into it. This may alternatively be achieved by using two 2/2 directional control valves instead of the 3/2 directional control valve 43.

In the switched position of the 3/2 directional control valve 43 shown in FIG. 3, the dual-acting hydraulic cylinder 27 may be actuated by switching the valves 37 and 38 when pressure is applied in order to transfer the particular support wheel 24 to a raised position, for example at a headland or for transport purposes. In the raised position, the support wheels 24 are not in contact with the ground.

During ongoing harvesting mode, the 3/2 directional control valve 43 is in the (not shown) switched position in which the piston rod chamber 44 and the piston chamber 45 of the hydraulic cylinder 27 are connected to each other in a fluid-conducting manner. Pressure fluctuations due to shocks transmitted to the particular hydraulic cylinder 27 via the support wheels 24 flow via the 3/2 directional control valve 43 into the pressure accumulator 42 arranged or positioned downstream thereof and may be compensated. In one or some embodiments, for continuous pressure control of the particular hydraulic cylinder 27, the switchable valve 37 and the 2/2 directional control valve 38 of the valve assemblies VL, VR may be actuated by a control device 50.

In one or some embodiments, the control device 50 may include any type of computing functionality, such as at least one processor 65 (which may comprise a microprocessor, controller, PLA, or the like) and at least one memory 66. The memory 66 may comprise any type of storage device (e.g., any type of memory). Though the processor 65 and the memory 66 are depicted as separate elements, they may be part of a single machine, which includes a microprocessor (or other type of controller) and a memory. Alternatively, the processor 65 may rely on memory 66 for all of its memory needs.

The processor 65 and memory 66 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. Further, the functionality discussed herein, such as the determination of the capacitance, the determination of the distribution (e.g., the transverse distribution), the determination of the control, or the actuation of the control (e.g., sending commands to control the actuator(s)), may be performed by the computing functionality.

The control device 50 may be arranged or positioned to control the valve arrangements VL, VR both simultaneously and/or independently of each other. During continuous pressure control, the pressures in the two hydraulic cylinders 27 may be regulated to an equal value.

Furthermore, the particular hydraulic cylinder 27 may be actuated during the ongoing harvesting mode using the switchable valve 37 and the 2/2 directional control valve 38 when a change in the ground contour or reaching a slope necessitates that the attachment 3 is tracked in the transverse direction QR by pivoting about the virtual pendulum axis 21 of the pick-up device 6, which is explained in greater detail below.

In one or some embodiments, the piston chamber 45 is directly connected to the pressure line 36 by a compensation line 48 via the switchable 3/2 directional control valve 43, and optionally via a check valve 49. The optional check valve 49 arranged or positioned in the compensation line 48 prevents hydraulic fluid from entering the piston chamber 45 from the pressure line 36 while bypassing the 3/2 directional control valve 43.

In the shown switched position, the 3/2 directional control valve 43 connects the compensation line 48 to the tank 35 via the hydraulic line 47. In this switched position, the hydraulic cylinder 27 may be fully retracted to transfer the support wheel 24 to its transport position. The same may apply to reaching a headland during harvesting mode by switching the 3/2 directional control valve 43 to connect the piston chamber 45 to the tank 35 to cause the support wheel 24 to be lifted.

In this case, a control device 50 may be arranged or positioned on the attachment 3. The control device 50 may be configured to actuate the valve assembly VL, VR associated with the particular hydraulic cylinder 27 and may comprise the valves 37, 38 and 43 in each case, wherein the particular valve assembly VL, VR may be configured to regulate a hydraulic pressure provided by the pressure source 34 in the hydraulic cylinder 27 as a function of a selected operating mode of the attachment 3.

In one or some embodiments, sensors 51, 52 may be arranged or positioned on the particular hydraulic cylinder 27 and may be configured to detect its position relative to the attachment 3 and/or the set pressure in the particular hydraulic cylinder 27 of the support wheels 24. The signals from the sensors 51, 52 may be transmitted to the control device 50 for evaluation.

In one or some embodiments, the control device 50 may be configured for autonomous or automatic actuation of the valve arrangements VL, VR of the particular hydraulic cylinder 27. More specifically, the control device 50 may control the particular valve assembly VL, VR of the particular hydraulic cylinder 27 independently of the harvester 1 in order to track the attachment 3 in the event of a change in the ground contour in the transverse direction QR by freely pivoting about the virtual pendulum axis 21 of the pick-up device 6. The autonomously operating control device 50 may actively control or regulate the tracking of the attachment 3 in the transverse direction QR by varying the compression of the support wheels 24 by changing the pressurization of the particular hydraulic cylinder 27. Using the pressure regulation, for example, the valve assembly VL is actuated in such a way that the corresponding hydraulic cylinder 27 is pressurized by a lower pressure (e.g., is relieved) while the hydraulic cylinder 27 is pressurized by a higher pressure (e.g., is more strongly loaded) by a corresponding actuation of the valve assembly VR. As a result, the attachment 3 is pivoted to the left. In order to swivel the attachment to the right, the hydraulic cylinder 27 is correspondingly relieved by actuating the valve assembly VR, and the hydraulic cylinder 27 is loaded by correspondingly actuating the valve assembly VL. As soon as the adjustment of an actual transverse position to a target transverse position has been completed, both hydraulic cylinders may again be continuously regulated (e.g., uniformly pressurized).

Figure 4:
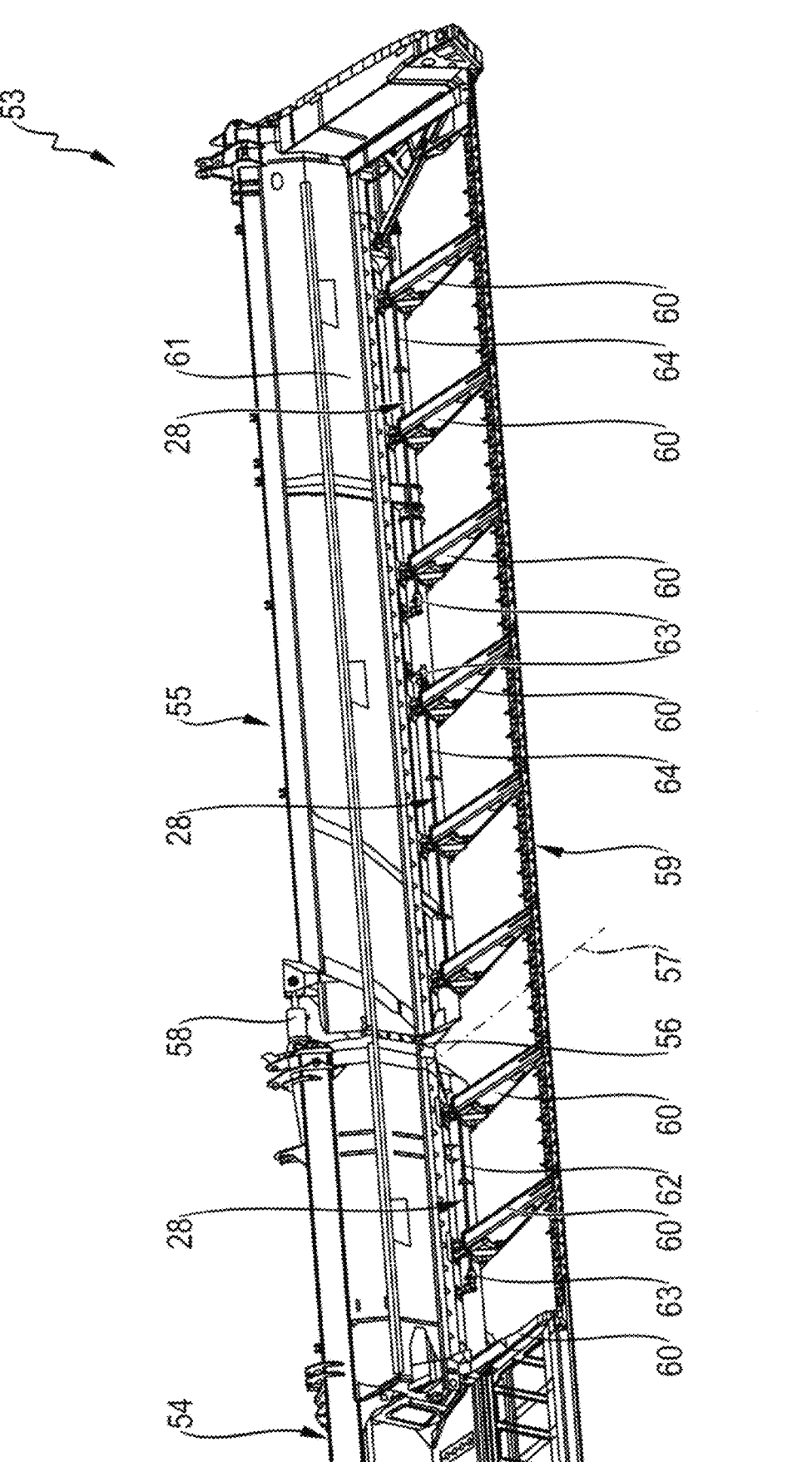
FIG. 4 schematically illustrates an example of a partial view of an attachment designed as a draper.

FIG. 4 schematic illustrates an example of a partial view of an attachment 3 designed as a draper 53. The design of the draper 53 depicted is mirror-symmetrical, so that the following explanations correspondingly apply to the half of the draper 53 that is not shown. The draper 53 comprises a center section 54 and at least two side sections 55, of which only one is shown in FIG. 4. Conveyor belts (not shown) are provided for conveying the picked-up crop and convey the harvested material in a known manner from the side sections 55 sideways to the center section 54. The particular side section 55 may be connected by a frame joint 56 to the center section 54 so as to be pivotable about a pivot axis 57 which may be oriented parallel to the direction of travel FR and may extend horizontally (such as substantially horizontally). The particular side section 55 may be pivoted in the vertical direction relative to the center section 54 about the pivot axis 57 using an actuator 58.

A flexible cutter bar 59 may be arranged or positioned in the front area of the attachment 3, which may be designed as a draper 53, and may extend substantially over the entire width of the draper 53. A plurality of support arms 60, which may be distributed over the width of the draper 53 and may be arranged or positioned with one end pivotable about an axis extending transversely to the direction of travel FR on the frame 61 of the draper 53, which may be subdivided or segmented into the center section 54 and the at least two side sections 55, support the cutter bar 59. Due to the pivotability of the support arms 60, the flexible cutter bar 59 may execute a compensating movement in a vertical direction in order to respond to a change in the ground contour. In so doing, the cutter bar 59 may undergo a substantially undulating deflection.

In one or some embodiments, the support arms 60 of the center section 54 may be connected to each other by a measuring shaft 62 which is non-rotatably connected to the particular support arm 60 (e.g., a respective support arm 60). At least one potentiometer 63 may be arranged or positioned on the measuring shaft 62, using which the vertical deflection of the support arms 60 connected to one another by the measuring shaft 62 is detected. The support arms 60 of the side sections 55 may also be connected to each other by at least one measuring shaft 64 which may be non-rotatably connected to the particular support arm 60 in a rotationally fixed manner. In this case, at least two measuring shafts 64 are provided on each side section 55. At least one potentiometer 63 may also be arranged or positioned on the particular measuring shaft 64. The measuring shafts 62, 64 and the associated potentiometers 63 may also form sensor assemblies 28 with which the distance 29 between the cutter bar 59 as the front area of the draper 53 and the ground 30 may be measured (such as continuously measured) in a manner known per se.

In one or some embodiments, the particular measuring shaft 64 connects only a part of the support arms 60 of the particular side section 55 to each other so that the number of measuring points is increased over the width of the draper 53. Due to the rotationally fixed connection of the support arms 60 to the particular measuring shafts 62, 64, the deflection of said support arm 60 may be used to determine the height position which has experienced the greatest deflection in the vertical direction due to the ground contour. The signals of the measuring shafts 62, 64 may be evaluated analogously to the signals of the sensor apparatuses 28 designed as sensing brackets 31 by the control device 50 on the attachment 3 and may be used to determine whether and/or how to actuate the valve assemblies VL, VR and the pressure regulation of the hydraulic cylinders 27, respectively.

As explained above, the side sections 55 may be pivoted by the actuators 58 about the pivot axis 57 transversely to the direction of travel FR (e.g., in the transverse direction QR). In its entirety, the draper 53 may be supported on the ground 30 by the laterally arranged or positioned support wheels 24. For this purpose, the draper 53 may be designed like the grain header 4 mentioned at the onset with the hydraulic system 33 already described.

In one or some embodiments, the pressure-controlled position regulation of the front attachment 3 or the draper 53 in the transverse direction QR may be performed using the laterally arranged or positioned support wheels 24, which may alternately be relieved of pressure or loaded with pressure in order to compensate for an actual transverse position of the front attachment 3 or the draper 53 deviating from a desired transverse position. Using this control, the cutting height specified by the piston cylinder unit 17 (e.g., the distance 29 between cutter bar 8 or 59 and ground 30) may be tracked, such as may be optimally tracked on average. Likewise, the pressure in the hydraulic cylinders 27 with which the support wheels 24 are pressed against the ground 30 may be kept constant (such as be kept constant on average).

For this purpose, the control device 50 may be configured to actuate the valve assembly VL, VR assigned to the particular hydraulic cylinder 27. The particular valve assembly VL, VR may be configured to regulate a hydraulic pressure provided by the pressure source 34 in the hydraulic cylinder 27 as a function of any one, any combination, or all of the selected operating mode, the cutting height control, the ground pressure control and, in the case of the draper 53, the flexible regulation of the cutter bar 59—according to which the cutter bar 59 of the draper 53 may follow the ground contour using the pivotable support arms 60 of the attachment 3. By actuating the particular valve assembly VL, VR, the support wheels 24 may be actuated in opposite directions as well as retracted and extended independently of each other.

When the attachment 3 is lowered into its working position, which may be predetermined according to the selected operating mode, the support wheels 24 may be extended under pressure control. The pressures in the hydraulic cylinders 27 of the support wheels supported on the ground 30 may continue to be controlled (e.g., to be continuously controlled in ongoing operation). The pressure may be monitored by the sensors 52 of the particular hydraulic cylinder 27. If, while evaluating the signals from the sensor assemblies 28, it is determined that the actual transverse position of the attachment 3 should be adjusted, for example because a section of slope has been reached, the hydraulic cylinders 27 of the support wheels 24 may alternately be relieved so that the required adjustment of the target transverse position to be maintained is set. For this purpose, when the attachment 3 is to be swiveled to the left, the left support wheel 24 may be relieved by the actuation of the valve assembly VL so that the pressure applied to the support wheel 24 by the hydraulic cylinder 27 is reduced, and the right support wheel 24 may additionally be loaded by the actuation of the valve assembly VR by being pressurized so that the pressure applied to the support wheel 24 by the hydraulic cylinder 27 increases. When the target transverse position is reached, the pressures in the hydraulic cylinder 27 may again be controlled continuously (e.g., by uniform pressurization).

When lifting the attachment 3, for example at the headland, the pressures in the hydraulic cylinders 27 may continue to be pressure-controlled. This may cause the hydraulic cylinders to continue to extend until they reach their end position. When the end position is reached, the hydraulic cylinders 27 may be retracted in a pressure-controlled manner.

In one or some embodiments, the harvester enables regulation of the transverse position of the attachment 3 independently of a design as a rigid grain header 4 or as a flexible draper 53, and/or independently of the at least one actuator/swivel cylinder 22a for transverse guidance of the attachment 3 which may be actuated by the harvester 1, arranged or positioned on the pick-up device 6, and may be designed as a swivel cylinder. When the attachment 3 is in in a certain mode (e.g., the working mode or harvesting mode), the control or regulation of the transverse guidance may be performed exclusively using the pressure-regulated hydraulic cylinders 27 of the support wheels 24.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Harvester
2 Combine
3 Attachment
4 Grain header
5 Machine frame
6 Pick-up device
7 Harvested material
8 Cutter bar
9 Transverse conveyor
10 Front axle
11 Running wheels
12 Longitudinal axis
13 Wheel gears
14 Piston cylinder unit
15 Axis
16 Inclined conveyor
17 Piston cylinder unit
18 Pivoting apparatus
18a Pendulum frame
18b Tilt frame
19 Frame structure
20 Frame structure
20a Support roller
20b Axis
20c Axis
20d Circular path
20e Circular path
21 Virtual pendulum axis
22 Piston cylinder unit
22a Actuator/swivel cylinder
23 Transverse axis
24 Support wheel
25 Holder
26 Axis
27 Hydraulic cylinder
28 Sensor apparatus
29 Distance
30 Ground
31 Sensing bracket
32 Axis
33 Hydraulic system
34 Pressure source
35 Tank
36 Pressure line
37 Valve
38 2/2 directional control valve
39 Hydraulic line
40 Pressure sensor
41 Throttle check valve
42 Pressure accumulator
43 3/2 directional control valve
44 Piston rod chamber
45 Piston chamber
46 Hydraulic circuit
47 Hydraulic line
48 Compensation line
49 Check valve
50 Control device
51 Sensor
52 Sensor
53 Draper
54 Center section
55 Side section
56 Frame joint
57 Pivot axis
58 Actuator
59 Cutter bar
60 Support arm
61 Frame
62 Measuring shaft
63 Potentiometer
64 Measuring shaft
65 Processor
66 Memory
FR Forward direction of travel
KS Bracket
QR Transverse direction
VL Valve assembly
VR Valve assembly

The invention claimed is:

1. A self-propelled harvester comprising:
a height-adjustable pick-up device configured to connect to an attachment that is configured to pick up harvested material, the height-adjustable pick-up device comprising a virtual pendulum axis on which the attachment is pivotable, the height-adjustable pick-up device configured for adaptive adjustment of a vertical distance of the attachment from ground, the height-adjustable pick-up device including at least one actuator configured for transverse guidance of the attachment;

a hydraulic system comprising a pressure source, a hydraulic circuit, and at least one hydraulic cylinder connected to the hydraulic circuit, wherein the hydraulic cylinder is configured to move at least one support wheel with respect to height, the at least one support wheel positioned on the attachment; and a control device configured to:

receive sensor data from one or more sensors configured to detect at least one aspect of the at least one support wheel positioned on the attachment;

evaluate the sensor data from the one or more sensors to determine a deviation from a desired transverse position, the sensor data indicative of an actual transverse position of the at least one support wheel; and control, based on the sensor data, modification of the actual transverse position by loading or unloading at least one hydraulic cylinder of the at least one support wheel by actuating one or more valve assemblies in opposite directions when pressurizing the at least one hydraulic cylinder; and wherein the harvester is configured to regulate position of the attachment in a transverse direction by pivoting about the virtual pendulum axis independently of the at least one actuator configured for transverse guidance of the attachment.

2. The harvester of claim 1, wherein the harvester is configured to regulate the position of the attachment in the transverse direction using the at least one support wheel positioned on a lateral area of the attachment.

3. The harvester of claim 2, wherein the at least one hydraulic cylinder of the at least one support wheel are designed as dual-acting hydraulic cylinders.

4. The harvester of claim 1, wherein the height-adjustable pick-up device further includes one or more hydraulic cylinders configured to modify a transverse position of the attachment.

5. The harvester of claim 4, wherein the control device is configured to:

determine a deviation of an actual transverse position of the attachment from a target transverse position of the attachment; and control pressurization of the one or more hydraulic cylinders based on the deviation.

6. The harvester of claim 4, wherein the control device is configured to:

determine an operating mode of the attachment; and actuate a valve assembly assigned to at least one of the one or more hydraulic cylinders, the valve assembly configured to regulate a hydraulic pressure, provided by a pressure source, in the at least one of the one or more hydraulic cylinders as a function of the operating mode of the attachment.

7. The harvester of claim 6, wherein the control device is positioned on the attachment.

8. The harvester of claim 6, wherein the control device is configured to autonomously actuate the valve assembly.

9. The harvester of claim 1, further comprising:

a plurality of independently operating sensor apparatuses assigned to the attachment and configured to detect distance between the attachment and the ground; and the control device configured to regulate the position of the attachment in the transverse direction based on the distance detected between the attachment and the ground.

10. The harvester of claim 1, wherein the at least one aspect of the at least one support wheel comprises one or both of a position of the at least one support wheel relative to the attachment or a set pressure of at least one hydraulic cylinder for the at least one support wheel.

11. The harvester of claim 1, wherein the control device is configured to:

determine, based on evaluating the sensor data, whether a target transverse position has been reached; and determine, based on whether the target transverse position has been reached and based on a selected operating mode of the harvester, whether to continue actuation of the one or more valve assemblies.

12. The harvester of claim 1, wherein the one or more sensors are part of one or more sensor apparatuses, the one or more sensor apparatuses comprising sensing brackets or comprising non-contact distance sensors.

13. The harvester of claim 1, wherein the attachment comprises a draper that includes a central section and at least two side sections which are each connected to the central section by a frame joint so as to be pivotable about a pivot axis running parallel to a longitudinal axis of the harvester; and wherein the hydraulic system comprises at least one actuator configured to pivot at least one of the at least two side sections relative to the central section about the pivot axis transverse to a direction of travel of the harvester.

14. A self-propelled harvester comprising:

a height-adjustable pick-up device configured to connect to a draper that is configured to pick up harvested material, the height-adjustable pick-up device comprising a virtual pendulum axis on which the draper is pivotable, the height-adjustable pick-up device configured for adaptive adjustment of a vertical distance of the draper from ground, the height-adjustable pick-up device including at least one actuator configured for transverse guidance of the draper, wherein the draper includes a central section and at least two side sections which are each connected to the central section by a frame joint so as to be pivotable about a pivot axis running parallel to a longitudinal axis of the harvester; and a hydraulic system comprising a pressure source, a hydraulic circuit, and at least one hydraulic cylinder connected to the hydraulic circuit, wherein the hydraulic cylinder is configured to move at least one support wheel with respect to height, the at least one support wheel positioned on the draper;

wherein the harvester is configured to regulate position of the draper in a transverse direction by pivoting about the virtual pendulum axis independently of the at least one actuator configured for transverse guidance of the draper;

wherein the hydraulic system comprises at least one actuator configured to pivot at least one of the at least two side sections relative to the central section about the pivot axis transverse to a direction of travel of the harvester;

wherein the draper comprises one or more supporting arms that are configured to pivot about an axis running in the transverse direction and are positioned on the central section and the at least two side sections;

wherein the one or more supporting arms carry a cutter bar;

wherein a plurality of sensor apparatuses are configured to detect a vertical deflection of the one or more supporting arms of the central section and the at least two side sections; and wherein each of the plurality of sensor apparatuses comprise a measuring shaft connected in a rotationally fixed manner to the one or more supporting arms of the central section.

15. The harvester of claim 14, wherein at least one measuring shaft is connected in a rotationally fixed manner to at least one supporting arm of at least one of the at least two side sections with potentiometers arranged thereon.

16. The harvester of claim 14, wherein the one or more supporting arms comprise a plurality of supporting arms; and wherein the plurality of supporting arms are connected to each other by a measuring shaft, which is non-rotatably connected to a respective support arm.

17. The harvester of claim 16, further comprising a control device configured to determine a deflection of respective support arms in order to determine a height position which has experienced a greatest deflection in a vertical direction due to a ground contour.

\* \* \* \* \*